United States Patent
Närvänen et al.

(10) Patent No.: US 7,420,964 B2
(45) Date of Patent: Sep. 2, 2008

(54) ARRANGING PACKET DATA CONNECTIONS IN OFFICE SYSTEM

(75) Inventors: Kai Närvänen, Pirkkala (FI); Petteri Zilliacus, Ylöjärvi (FI); Markku Rautiola, Tampere (FI)

(73) Assignee: Nokia Corporation, Espoo (FI)

( * ) Notice: Subject to any disclaimer, the term of this patent is extended or adjusted under 35 U.S.C. 154(b) by 1266 days.

(21) Appl. No.: 10/022,144

(22) Filed: Dec. 13, 2001

(65) Prior Publication Data

US 2002/0080757 A1 Jun. 27, 2002

(30) Foreign Application Priority Data

Dec. 15, 2000 (FI) .................................. 20002753

(51) Int. Cl.
*H04L 12/66* (2006.01)

(52) U.S. Cl. ............... 370/353; 370/352; 370/354; 370/355; 370/356; 370/465; 370/466; 455/443; 455/444; 455/445; 455/446; 455/447; 709/220; 709/230; 709/250

(58) Field of Classification Search ................ 370/352, 370/353, 354, 355, 356, 465, 466; 455/443, 455/444, 445, 446, 447; 709/220, 230, 250
See application file for complete search history.

(56) References Cited

U.S. PATENT DOCUMENTS

| | | | | |
|---|---|---|---|---|
| 5,949,775 | A * | 9/1999 | Rautiola et al. | 370/338 |
| 6,370,385 | B1 * | 4/2002 | Bohm et al. | 455/450 |
| 6,442,401 | B1 * | 8/2002 | Behan | 455/552.1 |
| 6,687,252 | B1 * | 2/2004 | Bertrand et al. | 370/401 |
| 6,741,853 | B1 * | 5/2004 | Jiang et al. | 455/418 |
| 2002/0080757 | A1 * | 6/2002 | Narvanen et al. | 370/338 |

FOREIGN PATENT DOCUMENTS

| | | |
|---|---|---|
| EP | 0766427 | 4/1997 |
| WO | WO 99/48312 | 9/1999 |
| WO | WO 00/28752 | 5/2000 |
| WO | WO 00/76145 A1 | 12/2000 |

OTHER PUBLICATIONS

Corresponds to Finnish Patent Application No. FI 107979.
Corresponds to Finnish Patent Application No. FI 105740.
GSM 03.60 V6.2.0 (Oct. 1998), Digital Cellular Telecommunications System (Phase 2+); General Packet Radio Service (GPRS); Service Description; Stage 2.
1) 3G TS 23.060 Draft-21, version 3.1.0.
2) Search Report No. EP 01 00 0617 dated Oct. 13, 2003.

* cited by examiner

*Primary Examiner*—Raj K Jain
(74) *Attorney, Agent, or Firm*—Perman & Green, LLP

(57) ABSTRACT

A method for establishing a packet data connection in a telecommunications system which includes an office network, an operator network, and a local area network between them. Data transmission from the office network through the local area network is adapted to a data transmission protocol according to a mobile system. The office network also includes a serving support node, a packet control unit, and a gateway support node, which are arranged to support the packet data protocol of the mobile system. The serving support node, packet control unit, and gateway support node are arranged to have a functional connection with each other and with a radio access gateway. A packet data connection request is made from a mobile station to the office network, and a packet data connection is established from the serving support node and gateway support node to a destination address defined by the link request.

6 Claims, 4 Drawing Sheets

ARRANGING PACKET DATA CONNECTIONS IN OFFICE SYSTEM

BACKGROUND OF THE INVENTION

The invention relates to wireless office systems, especially to routing packet data connections in an office system.

Information systems in offices are traditionally designed in such a manner that the telephone network and the data network connecting computers and their peripherals, typically a local area network, are separate networks. The development and convergence of different data networks and telephone networks on one hand and the costs that arise from building and maintaining two parallel networks on the other hand, have led to developing systems for providing the services of telephone networks through local area networks. One significant factor in this development has been an improved applicability of IP (Internet protocol) technology, used conventionally in data networks, to providing telephone services.

In a modern office information system, a mobile system can also be combined to operate through a local area network, in which case voice calls based on a mobile system protocol are routed by means of a local area network (LAN), which typically uses IP technology, through an office-specific base transceiver station (BTS), for instance, to mobile stations (MS). A conventional private branch exchange (PBX) of the office can then be bypassed, and it is also possible to ensure broadband connections at short distances and an excellent quality of speech even in wireless data transmission. Mobile stations establish a wireless connection to an office-specific base transceiver station and then through a local area network both to other mobile stations in the office and through a mobile switching centre (MSC) to external terminals, such as mobile stations outside the office system or terminals of a public switched telephone network (PSTN). One such system is described in patent application U.S. Pat. No. 5,949,775.

A problem with the arrangement described above is that the office system is arranged to route only circuit-switched speech connections to or from the mobile station. Mobile stations establish a connection to the office system through a typical mobile system base transceiver station BTS which comprises an interface which is arranged to route only circuit-switched speech connections to the office system, such as an interface corresponding to the functions of an Abis interface of the GSM system. Packet-switched applications have, however, also been developed for mobile systems. For instance, ETSI (European Telecommunications Standards Institute) has during the last few years drafted GSM 2+ phase standards for the European digital GSM (Global System for Mobile communication) mobile network, which also define a new packet-switched data transmission service GPRS (General Packet Radio Service). GPRS is a packet radio network which utilises the GSM network and endeavours to optimise data packet transmission on the air interface between a mobile station and the GPRS network by means of GPRS protocol layers. A mobile station connected to an office system through an office-specific base transceiver station cannot utilise services implemented by GPRS, because the typical office-specific base transceiver station BTS described above does not comprise an interface to the GPRS system and thus does not support GPRS protocol layers. This restricts the utilisation of different data services on both internal and external mobile connections of an office.

BRIEF DESCRIPTION OF THE INVENTION

It is thus an object of the invention to develop an arrangement, by means of which a mobile station connected to an office system can establish a packet-switched connection inside the office system or to an external packet data network. The object of the invention is achieved by a method and system characterized by what is stated in the independent claims.

Preferred embodiments of the invention are set forth in the dependent claims.

The invention is based on arranging the gateway elements required for establishing a packet data connection of a packet data network, such as GPRS, into the office system in such a manner that internal data connections of the office system to mobile stations can be routed through said gateway elements. According to a preferred embodiment of the invention, the gateway elements are arranged in the same network element with the network element which controls the office-specific base transceiver stations of the office system, in which case the network element can control several base transceiver stations. Alternatively, an office-specific base transceiver station BTS can advantageously also be integrated to these. This way, the office system can be connected to a packet data network, such as the GPRS network, through this network element, and on the other hand, the internal packet data connections of the office system can be handled using said network element.

The method and arrangement of the invention provide the advantage that internal packet data connections of an office system can be established using the functions of the office system only, and the packet data connections, such as GPRS connections, need not be routed through a public land mobile network, such as the GSM network. This way, mobile stations in an office system can be provided with cheap, in practice free, packet data connections inside the office system, and the links can, if necessary, be encrypted specifically for each office system. In addition, packet data capacity of the public land mobile network is saved, since the internal packet data connections of an office system need not be routed through the public network.

BRIEF DESCRIPTION OF THE FIGURES

In the following the invention will be described by means of preferred embodiments and with reference to the appended drawings in which.

DETAILED DESCRIPTION OF THE INVENTION

In the following, the invention will be described by way of example on the basis of the GSM system and the GPRS system connected to it. An office system of the invention can, however, also be implemented to any other mobile system which comprises packet data functions essential for the implementation of the invention. This invention can be applied to the third-generation mobile system UMTS (Universal Mobile Telecommunication System), for instance, which comprises functions corresponding to the GPRS system.

Figure 1:
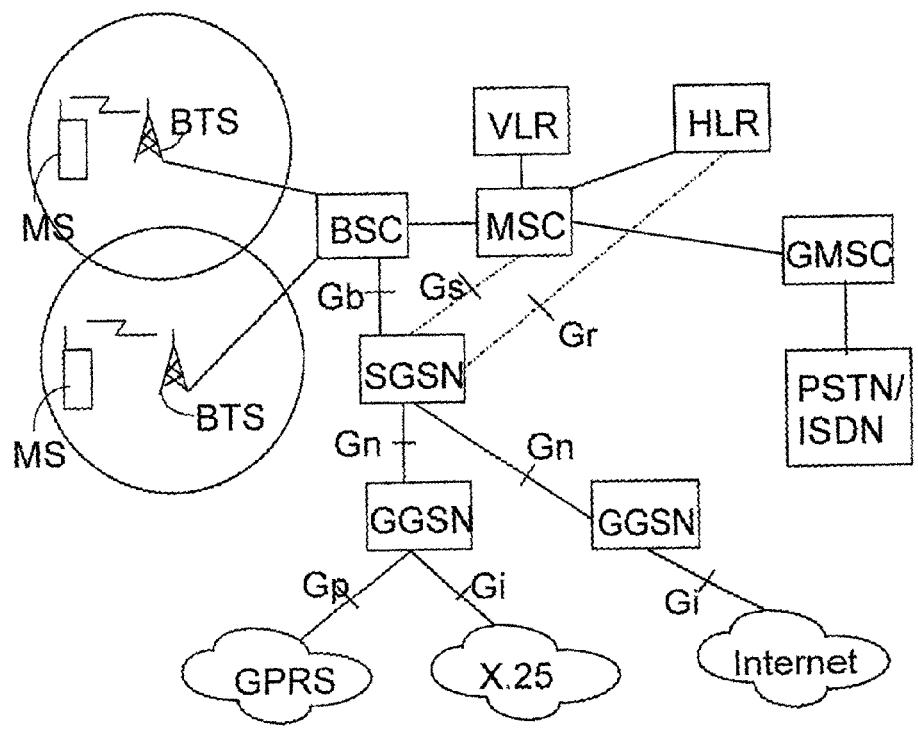
FIG. 1 is a block diagram showing the structure of the GSM and GPRS systems.

FIG. 1 illustrates how the GPRS system is built on the GSM system. The GSM system comprises mobile stations (MS) which have a radio connection to base transceiver stations (BTS). Several base transceiver stations BTS are connected to a base station controller (BSC) which controls the radio frequencies and channels available to them. The base station controller BSC and the base transceiver stations BTS form a base station subsystem (BSS). The base station controllers BSC are connected to a mobile services switching centre (MSC) which takes care of connection establishment and call routing to correct addresses. In this, two databases containing information on mobile subscribers are used: a home location register (HLR) which contains information on all subscribers in the mobile network and the services they subscribe to, and a visitor location register (VLR) which contains information on mobile stations visiting the area of a given mobile services switching centre MSC. The mobile services switching centre MSC is connected to other mobile services switching centres through a gateway mobile services switching centre (GMSC) and to a public switched telephone network (PSTN). For a more detailed description of the GSM system, reference is made to the ETSI/GSM specifications and the book *The GSM system for Mobile Communications*, M. Mouly and M. Pautet, Palaiseau, France, 1992, ISBN:2-957190-07-7.

The GPRS system connected to the GSM system comprises two nearly independent functions, i.e. a gateway GPRS support node GGSN and a serving GPRS support node SGSN. The GPRS network can comprise several gateway and serving support nodes, and typically, several serving support nodes SGSN are connected to one gateway support node GGSN. Both support nodes, SGSN and GGSN, act as routers which support the mobility of the mobile station, control the mobile system and route data packets to the mobile stations regardless of their location and the used protocol. The serving support node SGSN is connected to the mobile station MS through the mobile network. The connection to the mobile network (interface Gb) is typically established through a base station controller BSC which typically comprises a packet control unit PCU, which creates the function required by the interface Gb in the base station controller BSC and controls the transmission of data packets on from the base station controller. A task of the serving support node SGSN is to detect mobile stations capable of GPRS connections in its service area, to transmit and receive data packets from said mobile stations and to monitor the location of mobile stations in its service area. The user data of all GPRS mobile stations in the service area of the serving support node SGSN goes through said serving support node. Further, the serving support node SGSN is connected to a mobile switching centre MSC and a visitor location register VLR through a signalling interface Gs, to a short message switching centre SMS-GSMC for incoming short messages through an interface Gd, and to a home location register HLR through an interface Gr. GPRS records comprising the contents of subscriber-specific packet data protocols are also stored in the home location register HLR.

The gateway support node GGSN acts as a gateway between the GPRS network and an external packet data network PDN. External packet data networks include the GPRS network of another network operator, the Internet, or an X.25 network. The gateway support node GGSN is connected to said packet data networks through interfaces Gp (another GPRS network) and Gi (other PDNs). Private local area networks are typically connected to one of said packet data networks through a router. Data packets transmitted between the gateway support node GGSN and the serving support node SGSN are always encapsulated according to the GPRS standard. The gateway support node GGSN also contains PDP (Packet Data Protocol) addresses and routing information, i.e. SGSN addresses, of the GPRS mobile stations. The routing information is used to link data packets between an external data packet network and the serving support node SGSN. The GPRS backbone network between the gateway support node GGSN and the serving support node SGSN is a network utilising the IP protocol, preferably the IPv6 (Internet Protocol, version 6).

Figure 2:
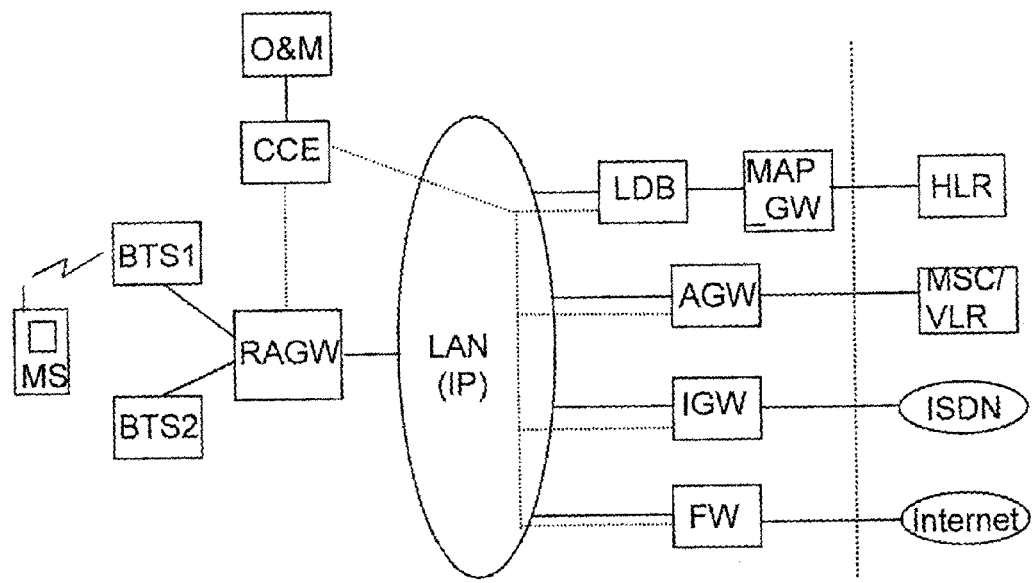
FIG. 2 is a block diagram showing the structure of a known office information system.

FIG. 2 shows the structure of a known office information system, in which system a GSM-based mobile system is connected to operate with an IP-based local area network LAN of the office. This kind of office system can be divided into two logical parts on the basis of its functions: office network and operator network. The office network, shown on the left side of the local area network LAN in FIG. 2, comprises network elements connected to the local area network of the company and comprising office-specific base transceiver stations BTS, a radio access gateway RAGW, and a call control entity CCE. To work with public telephone networks, this kind of office system requires defined interfaces which are arranged to be managed by means of the operator network and its elements, belonging to the office system. The operator network, shown on the right side of the local area network LAN in FIG. 2, comprises an A-interface gateway AGW to the mobile services switching centre MSC of the GSM network and on to a PSTN/ISDN network. Connection to the ISDN network can also be established directly through an ISDN gateway IGW. IP-based data transmission and reception from the office system to external IP-based networks, such as the Internet, can be handled through a firewall FW. By means of the firewall FW, it is easy to define the networks, sub-networks, network addresses, and applications which are allowed to establish connections to each other, and thus prevent unauthorised access to the office network. The operator network also comprises a location database LDB connected to the home location register HLR of the GSM network through a mobile application part protocol gateway MAP_GW. The elements of the operator network can act as interfaces to several different office networks.

A mobile station MS used on the office network side can be genuinely according to the GSM standard, and it communicates with office-specific GSM base transceiver stations BTS1, BTS2. The base transceiver stations BTS are connected to an office-specific radio access gateway RAGW. RAGW takes care of signal conversions and the necessary data conversions between the base transceiver station BTS and the used local area network LAN. RAGW also handles handover management between the base transceiver stations BTS and controls the base transceiver station BTS and thus also the radio network and resources. As seen from the base transceiver station BTS, RAGW functions as a base station controller BSC of the GSM system. The call control entity CCE takes care of call control and mobility management for the radio access gateways RAGW within its area and the mobile stations MS visiting the area of the radio access gateways. CCE handles change of address functions and collects call data records. In addition, the call control entity CCE acts as an interface to operation and maintenance (O&M) managed by an O&M server.

The call control entity CCE also acts as a signalling interface to different elements of the operator network through the IP-based local area network LAN, which is shown by dashed lines in FIG. 2. CCE can grant rights to reserve data transmission resources for a mobile station MS by utilising the location database LDB for this purpose. LDB handles different directory services, such as maintenance of information on mobile stations and subscribers and transmission of the information to CCE when necessary. LDB also maintains location updates of mobile stations MS and collects billing information from the call control entity CCE. LDB typically also has a connection to the home location register HLR of the GSM network through the MAP protocol gateway MAP_GW. In operation, LDB thus corresponds to the visitor location register VLR of the GSM system. Further, the call control entity CCE is connected to the A-interface gateway AGW which does data (speech or data flow) and signalling conversions between the local area network and the mobile services switching centre MSC of the GSM network. This way, a data transmission connection can be established between the radio access gateway RAGW and the GSM network. A second gateway of the operator network is the ISDN gateway IGW through which a direct connection to ISDN networks can be established. The network addresses and applications allowed to establish a connection are defined in the settings of the firewall FW which is the firewall function towards the external IP networks, such as the Internet or public GPRS network.

From the GSM system viewpoint, especially its mobile services switching centre MSC, this kind of office system which comprises an office network and an operator network can be seen as one base station subsystem BSS which has its own location area code LAC. All elements of the office system reside between interfaces A, Abis and MAP defined according to the GSM system, and, on the other hand, between the network elements MSC, HLR, and BTS. Thus, the office system supports call control functions according to the GSM system and GSM data, telefax and SMS services transmitted to and from the office system.

In the office system described above, calls can be routed by using speech transmission utilising the IP protocol, i.e. VoIP (Voice over IP) solutions. The most commonly used standard in implementing IP speech is H.323 defined by ITU (International Telecommunication Union), which defines the compression of voice and video images used in video conferencing programs and call control. The H.323 standard specifies the transmission of packet-based multimedia information in systems which do not necessarily guarantee the quality of service (QoS). The H.323 standard can be applied to any IP-based (Internet protocol) network, such as the Internet. H.323 can be used in both point-to-point calls and different point-to-multipoint applications.

In the office system described above, the H.323-based IP speech transmission is done by performing a protocol conversion either in the base transceiver station BTS or radio access gateway RAGW between the protocol of a wireless telecommunications network, such as the GSM network, and the H.323 format. Speech data according to the wireless telecommunications network transmitted from a mobile station MS to the base transceiver station BTS is converted into H.323 format either in the base transceiver station BTS or the radio access gateway RAGW and correspondingly, H.323-format speech data being transmitted to a mobile station MS is converted to the format of the wireless telecommunications network. This function can be implemented in a gateway defined in the H.323 standard (H.323 gateway).

The H.323 standard contains several protocols. Depending on the application, either a reliable or a non-reliable transmission protocol, typically TCP (Transmission Control Protocol) or UDP (User Datagram Protocol) is run on top of the IP network protocol. RTP/RTCP (Real-time Transport Control Protocol) takes care of packet composition and synchronisation of media flows I control data over a packet-switched network. The H.225 protocol handles especially tasks related to connection establishment, based on Q.931 signalling. The H.245 protocol defines conference control and capability exchange messages. The H.225 protocol defines for instance RAS (Registration, Admissions and Status) messages used in finding or registering call control entities and Q.931 messages used mainly in connection establishment between peers.

A second standard used in IP speech transmission is SIP (Session Initiation Protocol) defined by IETF (Internet Engineering Task Force), which is an application-level control protocol and which the radio access gateway RAGW can support. The SIP protocol is described in greater detail in the Internet standard proposal RFC (request for comments) 2543.

The base transceiver stations BTS of the office system described above are thus base transceiver stations according to the GSM system, to which a mobile station belonging to the office system establishes a connection when in the area of the office system. However, if the mobile station also supports GPRS services and the user of the mobile station wants to establish a fast data connection, the mobile station must establish a connection to another base transceiver station external to the office system and belonging to a base station subsystem BSS supporting GPRS and which is thus part of the public GSM network. The internal data connections of the office system to mobile stations must then also be routed through the public GSM network, which incurs extra costs to the user and also uses the GPRS capacity of the network operator.

Now according to the invention, the fast internal data connections of the office system to mobile stations can be arranged to be established according to the GPRS protocol by fitting the GPRS gateway elements SGSN and GGSN to the office system in such a manner that the internal data connections of the office system to mobile stations can be routed through them.

According to a preferred embodiment of the invention, the gateway elements SGSN and GGSN and the GPRS packet control unit PCU are arranged in the same network element with the radio access gateway RAGW. The office-specific base transceiver station BTS can also advantageously be arranged with these, or alternatively, the network element can control several base transceiver stations. This way, the office system can be connected to the GPRS network through this network element, and internal GPRS connections of the office system can be handled by said network element without needing to route the GPRS connections through the public GSM network.

Figure 3:
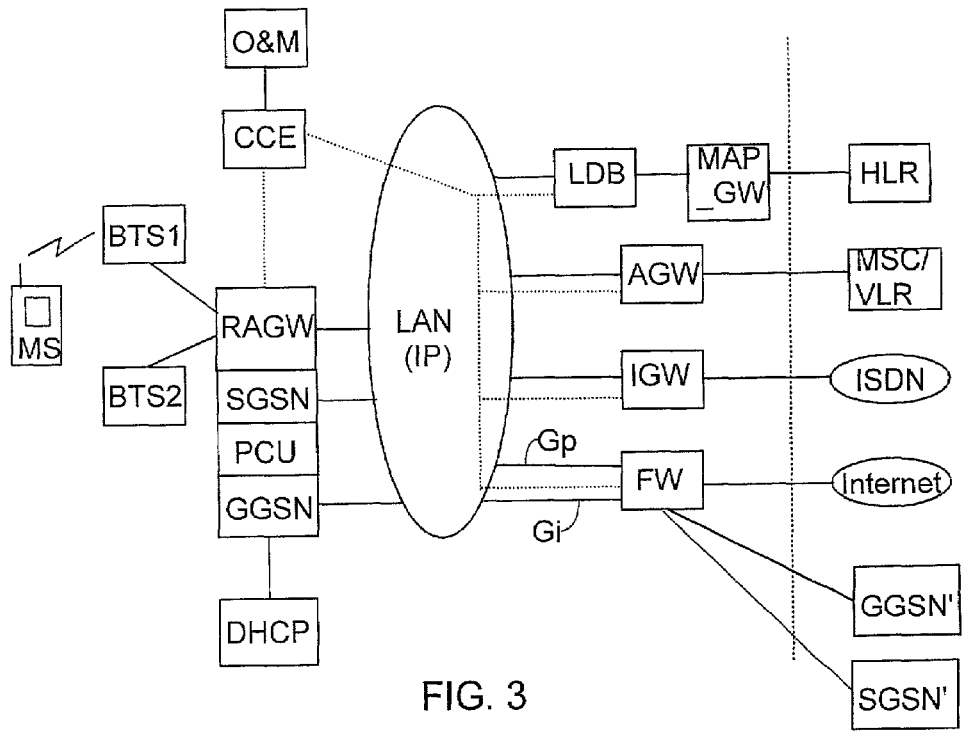
FIG. 3 is a block diagram showing the structure of an office information system according to a preferred embodiment of the invention.

The structure of an office system of the invention is illustrated by the block diagram in FIG. 3. Differing from the office system shown in FIG. 2, the gateway elements SGSN and GGSN and the packet control unit PCU are configured to the same network element as the radio access gateway RAGW. In FIG. 3, the network element controls two separate office-specific base transceiver stations BTS1 and BTS2, but the office-specific base transceiver station can also be integrated to said network element. This arrangement only describes the logical functional connection of the different elements RAGW, SGSN, GGSN, PCU and BTS, so as regards the implementation of the invention, one or more above-mentioned elements can be implemented as physically separate elements; the essential matter is arranging the functional connection between the elements. A data transmission connection is arranged from the network element, especially from the gateway support node GGSN, to a DHCP (Dynamic Host Configuration Protocol) server which is used for dynamic allocation of IP addresses for mobile stations MS. The network element also has a data and signalling link to the other elements of the office system through the local area network LAN.

The firewall FW in the local area network LAN provides the required interfaces for connection establishment with the public GPRS network maintained by the operator. The gateway support node GGSN and service support node SGSN of the office system can establish a connection through the firewall FW to a gateway support node GGSN' of the public GPRS network and through it on to the services provided by the public GPRS network. The serving support node SGSN can also establish a connection directly to a serving support node SGSN' of the public GPRS network. Thus, there can advantageously be two interfaces, Gi and Gp, according to the GPRS system in use through the firewall FW. The connection between the gateway support node GGSN of the office system and the external data packet network (the gateway support node GGSN' of PDN or the public GPRS network) is arranged to be according to the interface definition Gi and the connection between the serving support node SGSN of the office system and the gateway support node GGSN' or the serving support node SGSN' of the public GPRS network is arranged to be according to the interface definition Gp.

The office system of the invention can advantageously utilise this in such a manner that in connection with the authentication of mobile subscribers, the serving support node SGSN of the office system directs connection establishment requests of mobile stations not belonging to the office system to the public GPRS network and, if necessary, on through said gateway support node GGSN' to a destination address in the office system. Correspondingly, connection establishment requests of mobile stations belonging to the office system are directed from the serving support node SGSN of the office system through the gateway support node GGSN of the office system to a destination address. This way, the internal GPRS data transmission of the office system can be performed using solely the GPRS functions of the office system and the GPRS connections need not be routed through the public GSM network. Thus, mobile stations belonging to an office system can be provided with cheap, in practice free, GPRS connections inside the office system, and the connections can, if necessary, be encrypted for each office system. In addition, GPRS capacity of the public GSM network is saved, since the internal GPRS data transmission inside the office system need not be routed through the public network.

Figure 4A:
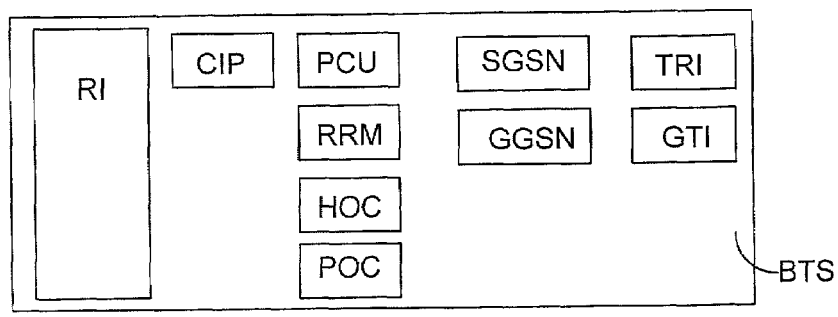
FIGS. 4a and 4b are block diagrams showing the implementation of GPRS functions according to preferred embodiments of the invention.
Figure 4B:
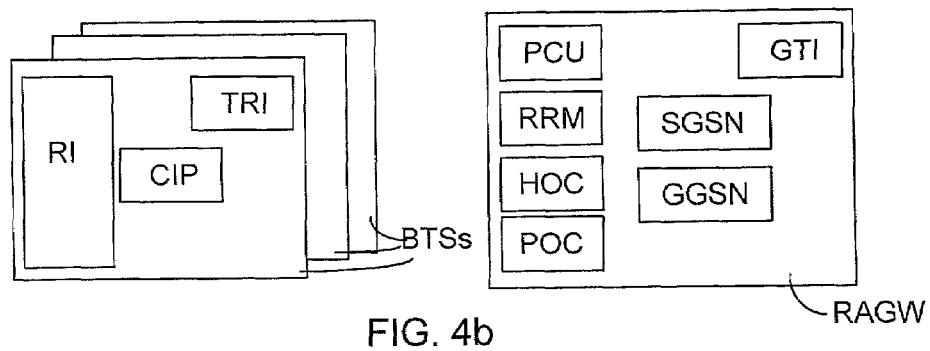

From the viewpoint of the office-specific base transceiver station BTS, the functional combination of elements described above can, in principle, be done in two ways which are illustrated in FIGS. 4a and 4b. In FIG. 4a, all GPRS functions are connected to one office-specific base transceiver station BTS. Thus, the base transceiver station BTS comprises, in addition to the gateway elements SGSN and GGSN and the packet control unit PCU, functions belonging typically to a radio access gateway RAGW, such as radio resource management RRM, handover control HOC, and power control POC. The functions of the base transceiver station BTS include arranging a radio interface RI and ciphering CIP. In addition, the base transceiver station BTS comprises a traffic interface TRI which can, for instance, be the H.323 gateway described above and which provides an H.323-based VoIP (Voice over IP) connection between the base transceiver station and the rest of the office system. Further, a separate interface GTI (GPRS Traffic Interface) should be defined in the base transceiver station BTS for GPRS-based data traffic.

In FIG. 4b, one radio access gateway RAGW controls several office-specific base transceiver stations BTS. The gateway elements SGSN and GGSN and the packet control unit PCU are then connected to the radio access gateway RAGW and its functions (RRM, HOC, POC). The interface GTI of GPRS data traffic is also implemented to the radio access gateway RAGW. The functions typically belonging to a base transceiver station, the radio interface RI and ciphering CIP, then remain in each base transceiver station BTS, and, in addition, the H.323-based traffic interface TRI can also be implemented separately to each base transceiver station.

The signalling interfaces arranged from the GPRS elements of the office system, such as the signalling interface Gs between the serving support node SGSN and the mobile services switching centre/visitor location register MSCNLR, the signalling interface Gd to the short message switching centre SMS-GMSC, and the signalling interface Gr to the home location register HLR, are formed as standard interfaces according to the GPRS system. Internal GPRS signalling of the office system can, if necessary, be adapted at least partly to H.323 signalling, for instance, in such a manner, however, that the functions corresponding to GPRS signalling can be performed.

The following describes performing different functions typical of the GPRS system, especially the connection of a mobile station MS to the office system and the establishment of a packet data connection, in the office system of the invention by means of different signalling examples. In these examples, the radio access gateway RAGW and the serving support node SGSN form a one network element which thus comprises the functions of both. The network element in question can advantageously also comprise other functions as described above, but to clarify signalling, other required network elements have been shown as separate elements. On the other hand, the office-specific base transceiver station BTS can be considered transparent to the signalling used in the examples and is, therefore, not shown at all. The described signallings are all known signallings of the GPRS system applied to the system of the invention, and for a more detailed description of them, reference is made to the GSM specification 03.60 v. 6.2.0 *"General Packet Radio Service (GPRS); Service description."*

Figure 5:
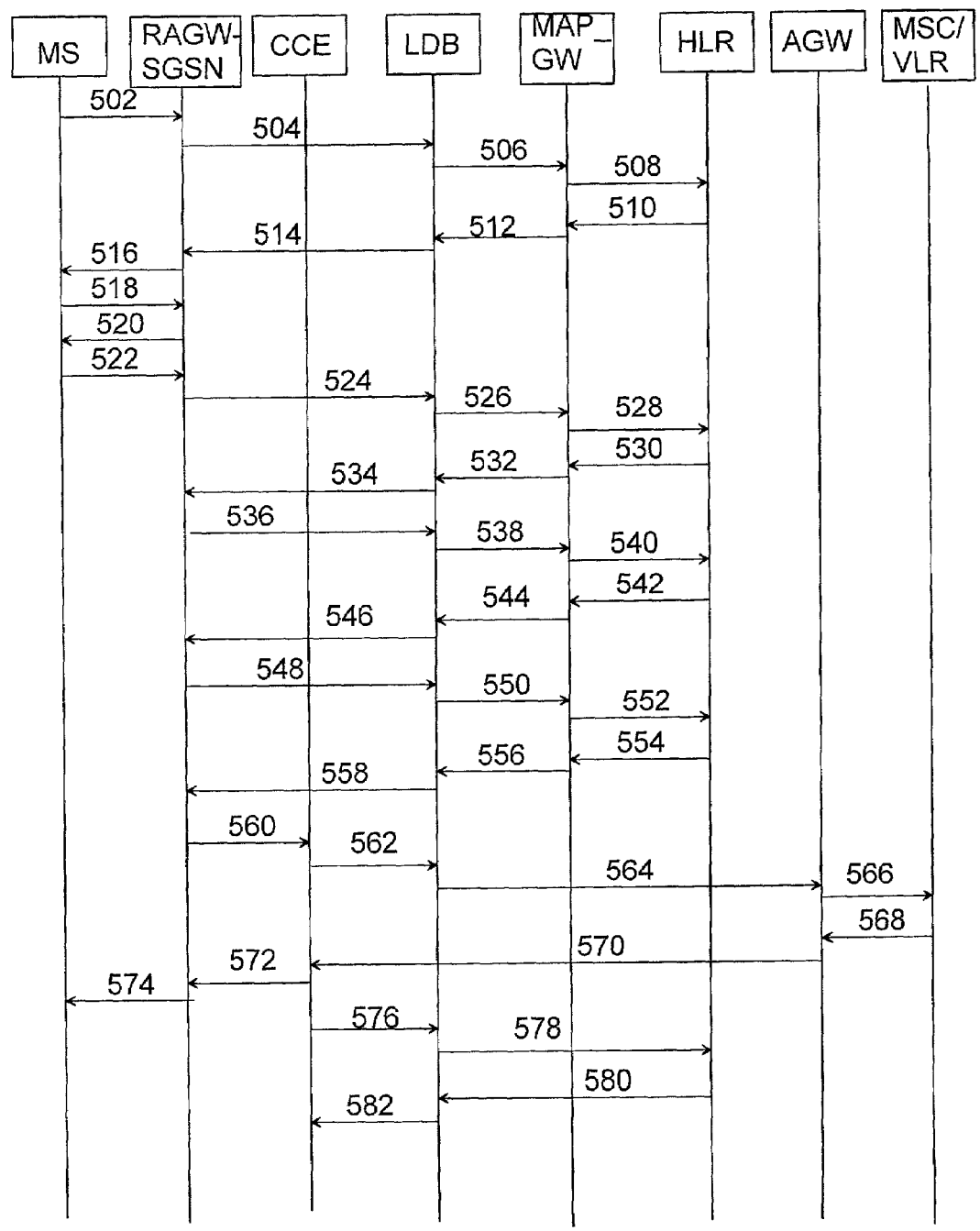
FIG. 5 is a signalling diagram showing a first location and routing area update of a mobile station to an office system according to the invention.

The signalling diagram of FIG. 5 describes an update of the location area and routing area in a situation where a mobile station MS tries to connect to the office system for the first time, and the location database LDB does not yet comprise subscriber information of the mobile station MS. Because the mobile station MS has earlier not registered into the office system, both the mobile subscriber and the terminal must be identified. In the GSM system, a mobile station MS comprises a mobile terminal MT and a SIM (Subscriber Identity Module) card attached to the terminal and comprising subscriber information. When the mobile station MS transmits a connection request (502, Attach_Req) to the radio access gateway RAGW-SGSN of the office system, RAGW-SGSN requests the information required for authentication (in the GSM system a random number RAND and a response SRES calculated from it according to an algorithm A3 on the basis of a subscriber-specific key Ki) first from the location database LDB of the office system (504, Send Auth_Info), which does not yet have the information, and after this, the request is made through the MAP gateway to the home location register HLR (506, 508). The home location register HLR returns the required authentication information to the radio access gateway RAGW-SGSN (510, 512, 514, Send Auth_Info_Ack), which transmits the random number RAND on to the mobile station MS and requests the performance of authentication (516, Auth_Req), in response to which the mobile station MS also calculates the number SRES and forwards it to the radio access gateway RAGW-SGSN (518, Auth_Res) to be compared with the number SRES calculated by the network. If the numbers match, the subscriber is authenticated.

Next, the system tries to identify the mobile terminal MT, which means that the radio access gateway RAGW asks (520, Identity_Req) for the IMEI (International Mobile Equipment Identity) code of the mobile station that is used to define an identity for each terminal. The mobile station transmits the IMEI code of the mobile terminal MT to the radio access gateway RAGW-SGSN (522, Identity_Res) which transmits a request to check the IMEI code through the location database LDB and MAP gateway to the home location register HLR (524, 526, 528, Check_IMEI) which checks from the equipment identity register EIR possible deficiencies in the access rights of the mobile terminal. An acknowledgement on the IMEI check (530, 532, 534, Check_IMEI_Ack) is transmitted to the radio access gateway RAGW-SGSN, and if the access rights of the terminal are in order, a location area update can be performed.

The radio access gateway RAGW-SGSN of the office system, especially its serving support node SGSN, transmits to the home location register HLR information on the change of the serving support node (536, 538, 540, Update_Location) in a message which comprises the identity number and address of the new serving support node and the IMSI identifier of the mobile subscriber. The home location register HLR removes the registration of the mobile station to the old serving support node and updates the GPRS subscriber information to the new serving support node RAGW-SGSN (542, 544, 546, Insert_Subscr_Data). RAGW-SGSN acknowledges the received subscriber information to the home location register (548, 550, 552, Insert_Subscr_Data_Ack), after which the home location register HLR acknowledges the location area update as done (554, 556, 558, Update_Location_Ack).

The radio access gateway RAGW-SGSN then updates the location/routing area in the mobile services switching centre/visitor location register MSC/VLR of the public GSM network. In the internal signalling of the office system, this is done using a WRQ message adapted for the office system, which thus is an addition to the RAS messages according to the H.225 protocol and inside which it is possible to transmit GSM-specific messages, at the same time controlling H.323-based network elements, however. The radio access gateway RAGW-SGSN transmits a location area update request first to the call control entity CCE (560, WRQ L3 LocUp_Req), at which time the call control entity CCE receives information on the fact that a mobile station MS belonging to the office system is trying to perform a location/routing area update to the office system. The location area update request is transmitted on to the A-interface gateway AGW (562, 564, WRQ L3 LocUp_Req) which disassembles from the WRQ message the GSM-specific message and transmits it on to the mobile services switching centre/visitor location register MSC/VLR (566, LocUpdate_Req). The mobile services switching centre/visitor location register MSC/VLR transmits an acceptance to the location area update request to the A-interface gateway AGW (568, LocUp_Acc) which then adapts the GSM-specific message to a WRQ message and transmits it through the call control entity CCE to the radio access gateway RAGW-SGSN (570, 572, WRQ L3 LocUp_Acc). After this, the radio access gateway RAGW-SGSN transmits to the mobile station MS an acceptance to the connection request (574, Attach_Acc), after which the mobile station MS can start to make GPRS service requests in the office system. So as to be able to answer the service requests of the mobile station MS, the call control entity CCE must update the subscriber information of the mobile station in question from the location database LDB which requests a subscriber information update from the home location register HLR (576, 578, LDB_Subscr_Info_Req). An acknowledgement on this information is first transmitted to the location database LDB and then to the call control entity CCE (580, 582, LDB_Subscr_Info_Ack), after which the call control entity CCE is ready to control the service requests of the mobile station MS.

Figure 6:
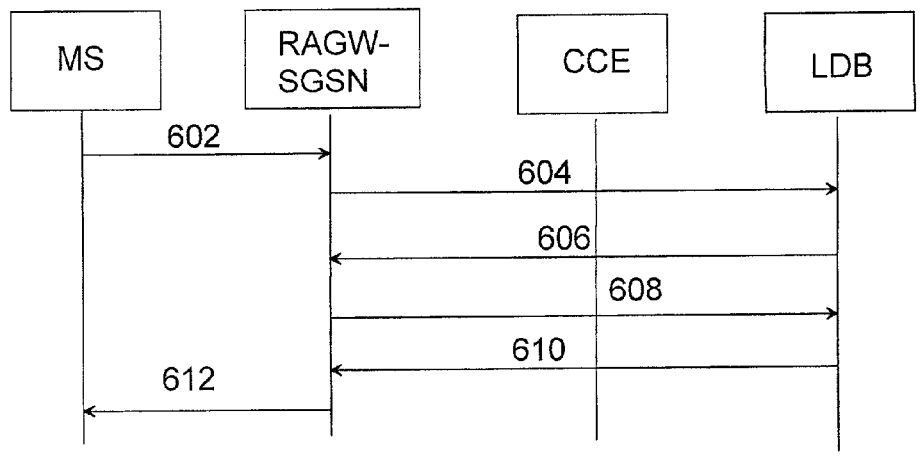
FIG. 6 is a signalling diagram showing a re-occurring location and routing area update of a mobile station to an office system according to the invention.

The signalling diagram of FIG. 6 describes a location area and routing area update in a situation, where the mobile station MS reconnects to the office system after an earlier connection when the subscriber information of the mobile station MS was stored in the location database LDB. When the mobile station MS transmits a connection request (602, Attach_Req) to the radio access gateway RAGW-SGSN of the office system, RAGW-SGSN requests the information required in authentication from the location database LDB of the office system (604, Send Auth_Info), but since the subscriber information is already stored in the location database LDB, the location database LDB transmits an acknowledgement that authentication is not needed (606, Send Auth_Info_Ack). The radio access gateway RAGW-SGSN of the office system, especially its serving support node SGSN, transmits to the location database LDB information on the connection of said mobile station MS to the serving support node in question (608, Update_Location), after which the location database LDB acknowledges the location area update as performed (610, Update_Location_Ack). The radio access gateway RAGW-SGSN acknowledges the acceptance of the connection request to the mobile station MS (612, Attach_Acc).

Figure 7:
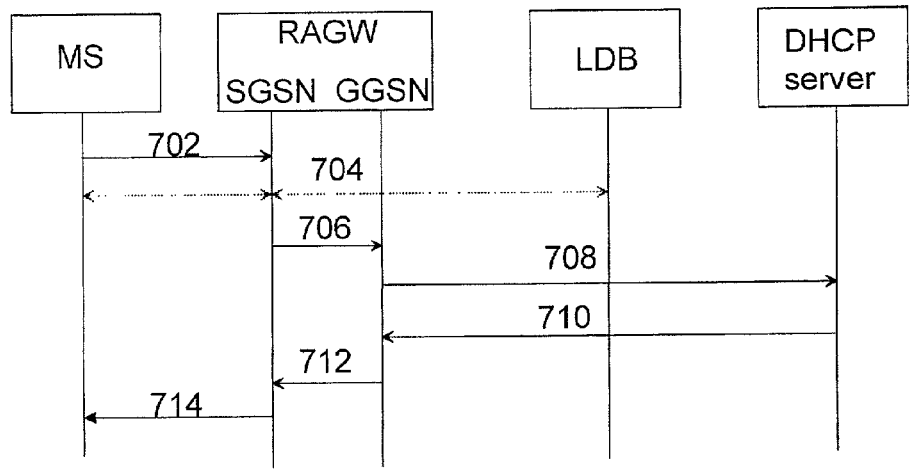
FIG. 7 is a signalling diagram showing the establishment of a packet data connection of the invention from a mobile station to an office system according to the invention.

The signalling diagram of FIG. 7 illustrates establishing a packet data connection from the mobile station MS. In packet-switched data transmission, a telecommunications network connection between a terminal and a network address is generally referred to as a PDP (Packet Data Protocol) context. This refers to the logical link between destination addresses, through which data packets are transmitted between destination addresses. This logical link can exist even though no packets were transmitted, in which case it also does not use up system capacity of other connections. The context thus differs from a circuit-switched connection, for instance.

The mobile station MS transmits a PDP context activation request (702, Activate_PDP_Req) to the radio access gateway RAGW-SGSN. The activation request can comprise not only terminal connection parameters but also definitions for a desired interface point to an external data network, for instance, and desired quality of service QoS parameters. The radio access gateway RAGW-SGSN can, if necessary, authenticate the mobile station from the location database LDB (704, Security Functions). Because the office system of the invention uses dynamic allocation of PDP addresses, the radio access gateway RAGW-SGSN makes a request to the gateway support node GGSN for defining a PDP address to the PDP context of the mobile station (706, Create_PDP_Context_Req). The radio access gateway RAGW-SGSN can in this request restrict the parameter definitions presented in the activation request, if for instance a subscriber profile in the network of the mobile subscriber or the network capacity prevents the establishment of a connection according to the requested parameter definitions. The gateway support node GGSN makes a final decision on granting the requested PDP context and its parameters, and if the PDP context is created, the gateway support node GGSN transmits to the DHCP server a request to define the PDP address (708, Address_Req). The DHCP server returns the defined PDP address (710, Address_Res) and the gateway support node GGSN transmits the granted PDP context address and parameters on to the radio access gateway RAGW-SGSN (712, Create_PDP_Context_Res). The radio access gateway RAGW-SGSN activates the created PDP context for the mobile station MS (714, Activate_PDP_accept), after which data packets can be transmitted between the mobile station and the destination address.

Figure 8:
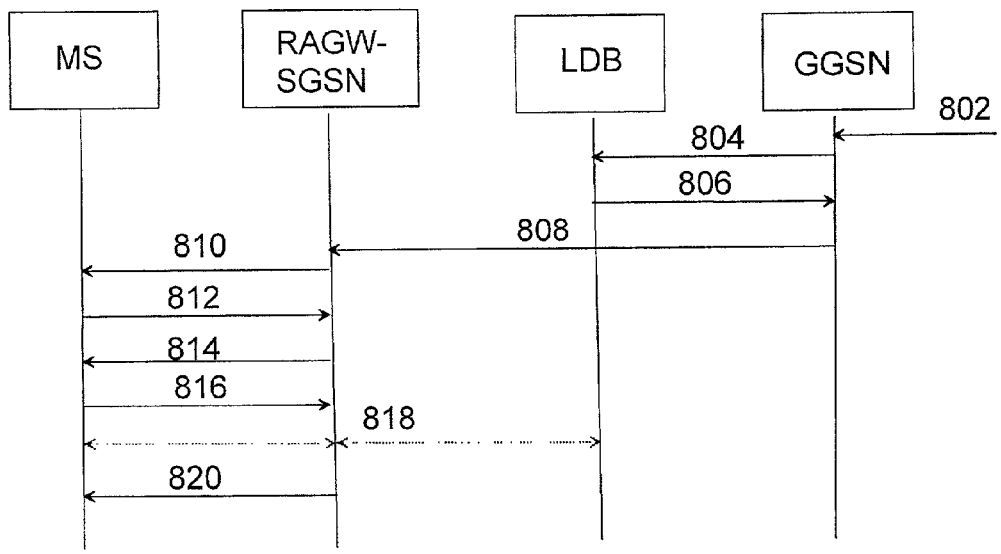
FIG. 8 is a signalling diagram showing the establishment of a packet data connection to a mobile station according to the invention.

The signalling diagram of FIG. 8 illustrates mobile terminated PDP context activation in the system of the invention. The gateway support node GGSN receives a data packet (802, PDP_PDU) and determines that an activation of the PDP context is required from the network. The gateway support node GGSN also places other data packets arriving in the same PDP context in a buffer to await onward transmission. The gateway support node GGSN can, if necessary, transmit a routing information request comprising the IMSI identifier of the subscriber (804, Send_Routing_Info) to the location database LDB, in response to which the location database LDB transmits an acknowledgement (806, Send_Routing_Info_Ack) comprising the IMSI identifier and SGSN address of the subscriber, if the connection request can be implemented. The gateway support node GGSN transmits the buffered data packets on to the radio access gateway RAGW-SGSN according to the given SGSN address (808, PDP_PDU).

At the time of the mobile terminated PDP context activation, the mobile station MS is typically in stand-by mode and must be set to ready mode before the data packets PDU are transmitted. This is done by performing paging of the mobile station MS, in which the radio access gateway RAGW-SGSN transmits a paging message (810, GPRS_Paging_Req) to the mobile station, and the mobile station's response to it is to transmit any data to the radio access gateway RAGW-SGSN (812, Any_LLC_Frame), the paging message is thus acknowledged and the mobile station set to ready mode. After this, the radio access gateway RAGW-SGSN transmits to the mobile station a request to activate the PDP context in question (814, Req_PDP_Activation), in response to which the mobile station MS transmits a PDP context activation request (816, Activate_PDP_Req) to the radio access gateway RAGW-SGSN. The radio access gateway RAGW-SGSN can, if necessary, perform mobile station authentication from the location database LDB of the office system (818, Security Functions) in the manner described above. Finally, the radio access gateway RAGW-SGSN activates the defined PDP context for the mobile station MS (820, Activate_PDP_Accept), after which data packets can be transmitted from the destination address to the mobile station.

The most common signallings used in the GPRS system and adapted to an office system of the invention are described above by way of example. It is obvious to a person skilled in the art that other GPRS-system signallings can also be adapted to an office system of the invention in a corresponding manner taking into consideration the GPRS elements of the office system. It is also clear that the method of the invention can also be applied to any other mobile system comprising the packet data functions essential for the implementation of the invention. Thus, the invention can, for instance, be applied to the third-generation mobile system UMTS.

It is obvious to a person skilled in the art that while technology advances, the basic idea of the invention can be implemented in many different ways. The invention and its embodiments are thus not restricted to the examples described above, but can vary within the scope of the claims.

The invention claimed is:

1. A telecommunications system which comprises an office network, an operator network, and a local area network between them, wherein the office network comprises:
   at least one mobile station configured to support a packet data protocol of the office network,
   a location database for registering mobile stations belonging to the office network and for managing location and subscriber information,
   a base transceiver station,
   a radio access gateway configured to control the base transceiver station and having a functional connection with the local area network and to configure data transmission protocols between said at least one mobile station and the local area network,
   a serving support node which is configured to support a packet data protocol of said at least one mobile station and to have a functional connection with said radio access gateway,
   a packet control unit which is configured to support the packet data protocol of said at least one mobile station and to have a functional connection with said radio access gateway and serving support node, and
   a gateway support node which is configured to support the packet data protocol of said at least one mobile station and to have a functional connection with said radio access gateway, serving support node, and packet control unit, and
   wherein the operator network comprises functions for configuring data transmissions from the office network through the local area network at least to the data transmission protocol according to said mobile station and used by a public land mobile network and for configuring a packet data connection from the office network through the local area network to at least the packet data protocol used by the public land mobile network;
   and in response to the packet data connection request made by a mobile station, the office network is configured alternatively to:
   establish a packet data connection to the destination address defined by the link request through the serving support node and gateway support node of the office network in response to the fact that said mobile station is registered to the office network, or
   route the packet data connection to the public land mobile network for onward routing to the destination address in response to the fact that the mobile station is not registered to the office network.

2. A telecommunications system as claimed in claim 1, wherein
   an office base transceiver station, radio access gateway, serving support node, packet control unit, and gateway support node are implemented as one element of the telecommunications system.

3. A telecommunications system as claimed in claim 1, wherein said radio access gateway, serving support node, packet control unit, and gateway support node are implemented as one element of the telecommunications system in such a manner that the element is configured to control one or more office base transceiver stations.

4. A telecommunications system as claimed in claim 1, wherein a data transmission connection is configured from the gateway support node to a Dynamic Host Configuration Protocol "DHCP" server for dynamically defining the IP addresses of mobile stations.

5. A telecommunications system as claimed in claim 1, wherein the operator network further comprises interfaces corresponding to said packet data protocol for establishing a packet data connection between at least the serving support node or gateway support node and an external data network.

6. A method comprising:

establishing a packet data connection in a telecommunications system which comprises an office network, an operator network, and a local area network between them, the office network comprising at least one mobile system terminal which is arranged to support a packet data protocol, a base transceiver station, and a radio access gateway controlling the base transceiver station and arranged to have a functional connection with the local area network, a serving support node, a packet control unit, and a gateway support node, which are configured to support the packet data protocol of said mobile system terminal and to have a functional connection with each other and with said radio access gateway, and a location database for registering mobile system terminals belonging to the office network and for managing location and subscriber information, wherein the operator network includes at least one function for configuring the packet data connection from the office network through the local area network to at least the packet data protocol used by the public land mobile network, wherein establishing the packet data connection comprises:

making a packet data connection request from the mobile system terminal to said office network, and in response to the packet data connection request made by the mobile system terminal, the office network is configured to alternatively:

establish a packet data connection from the office network to the destination address defined by a link request through the serving support node and gateway support node of the office network in response to the fact that said mobile system terminal is registered to the office network, or route the packet data connection to the public land mobile network for onward routing to the destination address in response to the fact that said mobile system terminal is not registered to the office network;

configuring data transmission protocols for data transferred between said mobile system terminal and the local area network in said radio access gateway, and configuring a data transmission from the office network through the local area network to at least the data transmission protocol according to said mobile system terminal and used by a public land mobile network in said operator network.

\* \* \* \* \*